US010621833B1

(12) United States Patent
Dadhaniya et al.

(10) Patent No.: US 10,621,833 B1
(45) Date of Patent: Apr. 14, 2020

(54) ATM SYSTEM WITH TRANSFER DEVICE AND INSTRUMENT CACHING CAPABILITIES

(71) Applicant: Capital One Services, LLC, McLean, VA (US)

(72) Inventors: Janak Dadhaniya, San Francisco, CA (US); Steve Faletti, Brooklyn, NY (US); David Kelly Wurmfeld, McLean, VA (US); Robert Smith, Richmond, VA (US); Lisa Whitsitt, Millbrae, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/405,276

(22) Filed: May 7, 2019

(51) Int. Cl.
*G06Q 40/00* (2012.01)
*G07F 19/00* (2006.01)

(52) U.S. Cl.
CPC .......... *G07F 19/205* (2013.01); *G07F 19/203* (2013.01); *G07F 19/206* (2013.01)

(58) Field of Classification Search
CPC .. G06Q 20/1085; G06Q 40/00; G06Q 20/108; G06Q 20/18; G07F 19/20; G07F 19/205; G07F 19/206; G05B 19/106; G05B 19/4166; B25J 5/02; B25J 9/0018; B25J 9/0084; B25J 9/1617
See application file for complete search history.

(56) References Cited

U.S. PATENT DOCUMENTS

2008/0091601 A1* 4/2008 Green ................ G06Q 20/1085 705/43
2012/0029687 A1* 2/2012 Hagen .................. B65G 1/0407 700/218
2016/0252893 A1* 9/2016 Kamyshnikov ...... G05B 19/106 700/231

FOREIGN PATENT DOCUMENTS

RU 106418 U1 7/2011

* cited by examiner

*Primary Examiner* — Thien T Mai
(74) *Attorney, Agent, or Firm* — Harrity & Harrity, LLP

(57) ABSTRACT

An automated teller machine (ATM) system may include an instrument storage and dispensing device configured to store and provide instruments, and a plurality of ATM head units. Each ATM head unit may be configured to interact with users to facilitate ATM-based transactions. The ATM system may include a transfer device configured to interface the instrument storage and dispensing device with each ATM head unit. The ATM system may cause the transfer device to obtain one or more instruments from the instrument storage and dispensing device based on user inputs received at one or more ATM head units, and cause the transfer device to deliver the one or more instruments to the one or more ATM head units after obtaining the one or more instruments.

20 Claims, 11 Drawing Sheets

100

ATM SYSTEM WITH TRANSFER DEVICE AND INSTRUMENT CACHING CAPABILITIES

BACKGROUND

An automated teller machine (ATM) is an electronic device that enables users to perform transactions without having to interact with other people. Such transactions may include depositing or withdrawing cash, reviewing account information, and/or the like.

SUMMARY

According to some possible implementations, an automated teller machine (ATM) system may include an instrument storage and dispensing device configured to store and provide instruments, and a plurality of ATM head units. Each ATM head unit, of the plurality of ATM head units, may be configured to interact with users to facilitate ATM-based transactions. The ATM system may include a transfer device configured to interface the instrument storage and dispensing device with each ATM head unit of the plurality of ATM head units. The ATM system may include one or more memories, and one or more processors, communicatively coupled to the one or more memories. The one or more processors may cause the transfer device to obtain one or more instruments from the instrument storage and dispensing device based on user inputs received at one or more ATM head units of the plurality of ATM head units, and cause the transfer device to deliver the one or more instruments to the one or more ATM head units after obtaining the one or more instruments.

According to some possible implementations, an automated teller machine (ATM) system may include an instrument storage and dispensing device configured to store and provide instruments, a user-facing presenter unit configured to interact with users to facilitate ATM-based transactions, and a transfer device configured to interface the instrument storage and dispensing device with the user-facing presenter unit. The transfer device may include a plurality of cache areas for storing preselected quantities of instruments. The ATM system may include one or more memories, and one or more processors, communicatively coupled to the one or more memories, configured to cause, based on a user input received at the user-facing presenter unit, the transfer device to align a cache area, of the plurality of cache areas, with the user-facing presenter unit, and provide a quantity of instruments, stored in the cache area, to the user-facing presenter unit.

According to some possible implementations, a method may include receiving, by a processor of an automated teller machine (ATM) system, an instruction relating to an ATM-based transaction. The ATM system may include an instrument storage and dispensing device configured to store and provide instruments, a plurality of ATM head units, and a transfer device configured to interface the instrument storage and dispensing device with each ATM head unit of the plurality of ATM head units. The instruction may be provided by an ATM head unit, of the plurality of ATM head units, based on a user input at the ATM head unit. The method may include causing, by the processor, the transfer device to obtain a particular quantity of instruments from the instrument storage and dispensing device based on receiving the instruction, and causing, by the processor, the transfer device to deliver the particular quantity of instruments to the ATM head unit after obtaining the particular quantity of instruments.

DETAILED DESCRIPTION

The following detailed description of example implementations refers to the accompanying drawings. The same reference numbers in different drawings may identify the same or similar elements.

Currently, an ATM device includes a head unit (e.g., a user-facing, or customer-facing, presenter unit, such as a user interface device) that is enclosed with a designated cash storage and dispensing device, such as a safe or a vault. Because the designated cash storage and dispensing device needs to be ruggedized for security reasons, placement, or layout, of multiple ATM devices in a given space is generally limited. In addition, users often have to wait a considerable amount of time for cash to be dispensed from a typical ATM device (e.g., due to having to wait for a picker to pick bills out of cassettes, and for the bills to be counted).

Some implementations, described herein, provide an ATM system that includes a transfer device that is capable of interfacing a single instrument storage and dispensing device (e.g., a single safe or vault) with multiple ATM head units. In some implementations, the ATM system may include a guided pathway along which the transfer device can move to obtain instruments from the instrument storage and dispensing device and to deliver obtained instruments to one or more of the ATM head units as needed. In some implementations, a transfer device may include multiple cache areas for storing preselected quantities of instruments, and for aligning with one or more withdrawal slots of an ATM head unit for dispensing of the instruments.

In this way, multiple ATM head units may share a single instrument storage and dispensing device, which permits for flexible placement of the ATM head units in a given space, and conserves costs associated with having multiple instrument storage and dispensing devices (including repair costs and/or maintenance costs). In addition, employing a transfer device, that includes cache areas, enables faster instrument dispensing and, therefore, increased ATM transaction throughput. This shortens the time needed for a user to remain logged in at an ATM head unit, which improves user experience and overall user account security, and conserves power resources of the ATM.

Figure 1A:
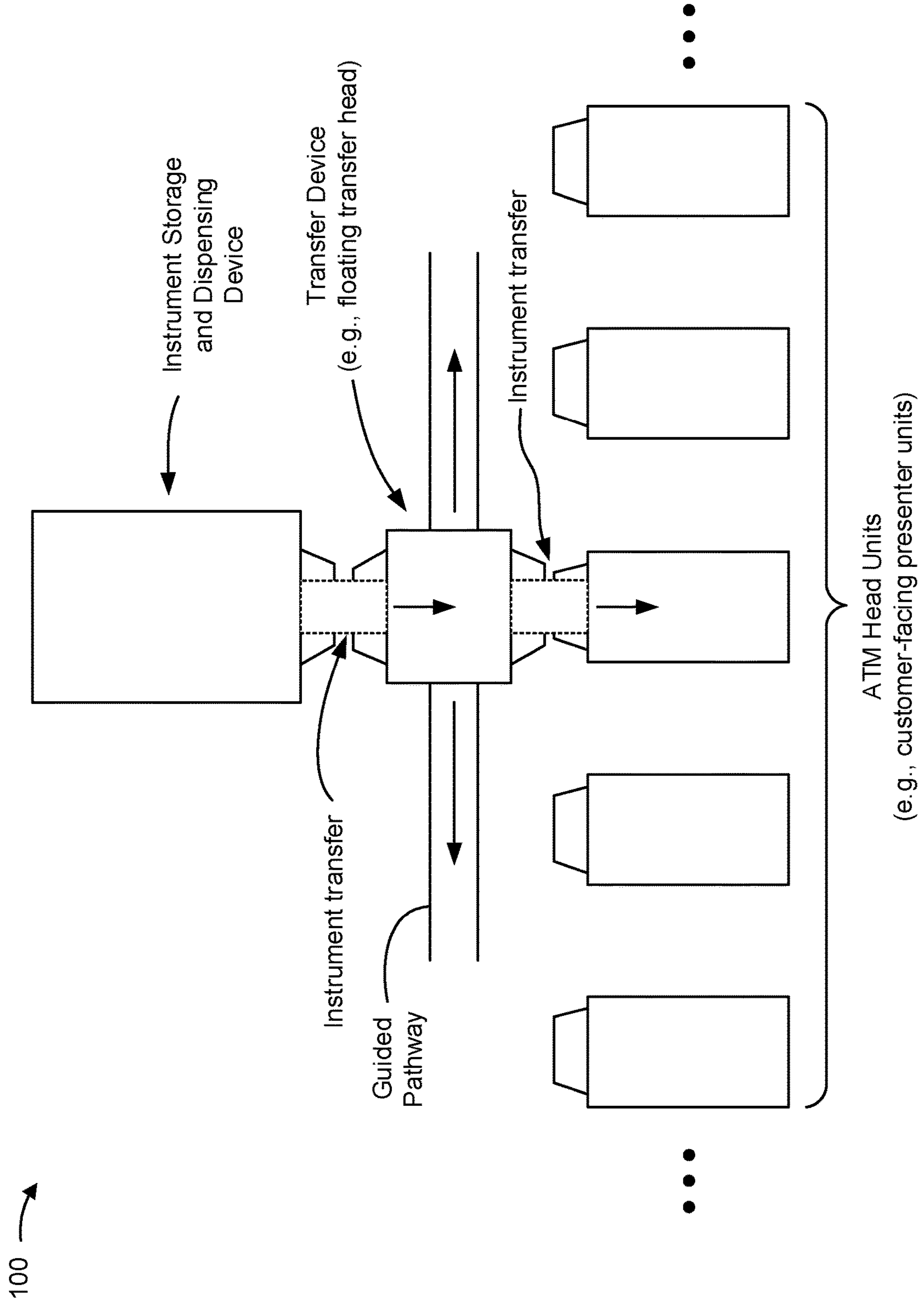
FIGS. 1A-1F are diagrams of an example implementation described herein.

FIGS. 1A-1F are diagrams of an example implementation 100 described herein. As shown in FIG. 1A, example implementation 100 may include an ATM system that includes an instrument storage and dispensing device, multiple ATM head units (e.g., customer-facing presenter units), and a transfer device. As shown, the ATM system includes a guided pathway (e.g., one or more rails and/or the like) along which the transfer device may move relative to the instrument storage and dispensing device and the ATM head units.

In some implementations, the transfer device may be configured as a floating transfer head that delivers instruments (e.g., cash, transaction cards, cashier's checks, and/or the like) from the instrument storage and dispensing device to one or more of the ATM head units as needed. In some implementations, in a case where an ATM system includes a large quantity of ATM head units, the ATM system may include multiple transfer devices that are each configured, or designated, to service a subset of the ATM head units, which enables faster ATM processing speeds than if only a single transfer device is employed to service all the ATM head units.

Although not shown, the ATM system may include one or more motors (e.g., stepper motors) configured to drive the transfer device along the guided pathway to positions in the guided pathway proximate, or adjacent, to an output portion of the instrument storage and dispensing device to facilitate obtaining instruments from the instrument storage and dispensing device, to positions in the guided pathway proximate, or adjacent, to respective input portions (e.g., that lead to withdrawal slots) of respective ones of the ATM head units to facilitate delivery of instruments to the ATM head unit(s), and/or the like. The motor(s) may include any suitable type of motor, such as, for example, a direct current (DC)-based motor, a synchronous-based motor, an induction-based motor, and/or the like. In some implementations, the ATM system may include one or more shafts and/or the like for coupling the transfer device and the motor(s), one or more power sources (e.g., for powering the motor(s)), electric/electronic circuitry (e.g., regulator(s) and/or the like), memory, and/or the like. In some implementations, the ATM system may include one or more encoders that enable accurate alignment of the transfer device with the instrument storage and dispensing device and the ATM head unit(s) (e.g., pathways leading, or coupled, to the ATM head unit (s)).

In some implementations, the ATM system may include a processor (e.g., one or more processing devices) configured to control the motor(s) for driving the transfer device. In some implementations, a single processor may control the transfer device as well as one or more of the ATM head units. Alternatively, each ATM head unit may include a processor that is configured to communicate with a dedicated processor that controls the motor(s).

In some implementations, the transfer device may include one or more wheels, or other roller-based mechanisms, for facilitating movement of the transfer device along the guided pathway. Alternatively, the transfer device may not include wheel(s), but may include one or more surfaces having a low coefficient of friction that permits the transfer device to easily traverse the guided pathway. Employing transfer device implementations, described herein, enables multiple ATM head units to share a single instrument storage and dispensing device, which conserves cost and space, since fewer instrument storage and dispensing devices are needed.

As an example, in operation, a first user may interact with a first ATM head unit (e.g., via a user interface, such as a capacitive touch screen and/or a keypad, via a mobile device communicatively coupled to the first ATM head unit, and/or the like) to conduct an ATM transaction, and a second user may similarly interact with a second ATM head unit to conduct another ATM transaction. Continuing with the example, the processor of the ATM system may, in accordance with one or more application instructions, and based on an input provided by the first user at the first ATM head unit—e.g., to obtain a particular amount of cash—cause the instrument storage and dispensing device to provision the particular amount of cash in a dispenser buffer area, control the motor(s) to drive the transfer device along the guided pathway to the instrument storage and dispensing device to obtain the particular amount of cash from the dispenser buffer area, and to drive the transfer device along the guided pathway to the first ATM head unit to provide the particular amount of cash to the first user. Further continuing with the example, the processor may, based on an input provided by the second user at the second ATM head unit—e.g., to obtain an amount of cash—similarly cause the instrument storage and dispensing device to provision the amount of cash in the dispenser buffer area, control the motor(s) to drive the transfer device along the guided pathway to the instrument storage and dispensing device to obtain the amount of cash from the dispenser buffer area, and to drive the transfer device along the guided pathway to the second first ATM head unit to provide the amount of cash to the second user.

In this way, a single instrument storage and dispensing device may be utilized to serve different users at different ATM head units. In addition, the instrument storage and dispensing device may be located separately, or externally, from the ATM head units (e.g., in a separate secured containing area), which improves overall security.

In some implementations, the transfer device may include a storage area for storing instruments, and one or more sets of roller components or finger-like components (e.g., that operate in a manner similar to that of throat mechanisms in an ATM device) configured to transfer instruments through the transfer device—e.g., to receive instruments from the instrument storage and dispensing device and/or to provide instruments to one or more ATM head units. In various implementations, the set(s) of roller components or finger-like components may be coupled to one or more motors controlled by the processor. In some implementations, the instrument storage and dispensing device and/or each of the ATM head unit(s) may similarly include roller component(s) and/or finger-like components (and corresponding motor(s)) configured to provide instruments to the transfer device and/or receive instruments from the transfer device.

In some implementations, the processor may be configured (e.g., based on one or more application instructions) to cause the transfer device to conduct instrument transfers, between the instrument storage and dispensing device and the various ATM head units, on a first-come, first-served basis (e.g., to conduct a cash transfer for a first user at a first ATM head unit, and then for a second user at a second ATM head unit, if the first user initiates a transaction prior to the second user). Alternatively, the processor may be configured to cause the transfer device to conduct instrument transfers based on an expected time to process/complete a transaction. For example, in a case where a first user wants to initiate a transaction involving a large amount of cash, and a second user wants to initiate a transaction involving a smaller amount of cash (e.g., which may take less time for the instrument storage and dispensing device to count and provision), the processor may cause the transfer device to conduct the transaction for the second user prior to conducting the transaction for the first user, which conserves power resources of the second ATM head unit (e.g., by virtue of the second ATM head unit completing the transaction much more quickly).

In some implementations, the ATM system may use one or more machine learning algorithms configured to learn how to prioritize the processing of ATM transactions amongst multiple ATM head units. In some implementations, the ATM system may provide information regarding prioritization criteria as input to one or more machine learning algorithms, which may perform machine learning to automate future determinations or predictions of how to prioritize the processing of ATM transactions amongst multiple ATM head units. For example, the ATM system may train a machine learning algorithm based on known inputs (e.g., information regarding an order in which instructions to perform ATM transactions are received from different ATM head units, information regarding different priorities of ATM transactions associated with different cash amounts, and/or the like) and known outputs (e.g., actual priorities assigned to different ATM transactions). In some implementations, the ATM system may refine a machine learning algorithm based on feedback received from a user and/or from one or more other devices (e.g., management device(s)). For example, the user and/or one or more management devices may provide information indicating whether predictions of prioritizations of ATM transactions amongst multiple ATM head units, made by the machine learning algorithm, are accurate and/or helpful. When the information indicates that a particular prediction is accurate and/or helpful, the ATM system may configure the machine learning algorithm to make predictions of prioritizations of ATM transactions amongst multiple ATM head units based on the particular prediction (e.g., to predict how to prioritize the processing of ATM transactions amongst multiple ATM head units in a manner similar to that in which the particular prediction was made). When the information indicates that a particular prediction is not accurate or helpful, the ATM system may configure the machine learning algorithm to avoid predicting prioritizations of ATM transactions amongst multiple ATM head units in a manner in which the particular prediction was made. In this way, the ATM system can predict how to prioritize ATM transactions amongst multiple ATM head units based on a machine learning algorithm, which improves the accuracy of the predictions, and conserves processor resources and/or storage resources that may otherwise be used to generate and store rules for such predictions.

Employing transfer device implementations, described herein, also enables flexible arrangements of ATM head units. For example, as an alternative to arranging ATM head units along a substantially straight line (e.g., in a row-like pattern, as shown in example implementation 100 of FIG. 1A), the ATM head units may be arranged in other configurations.

Figure 1B:
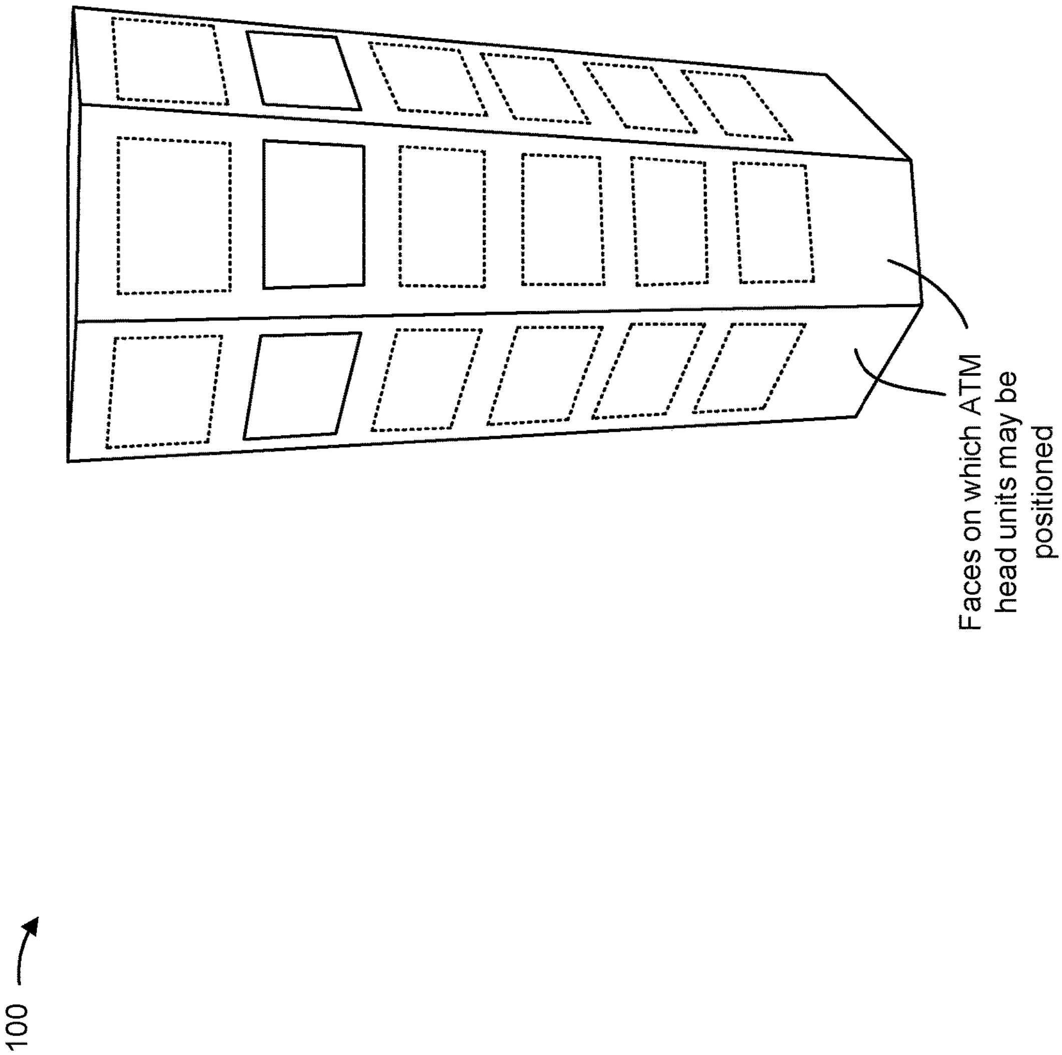
Figure 1C:
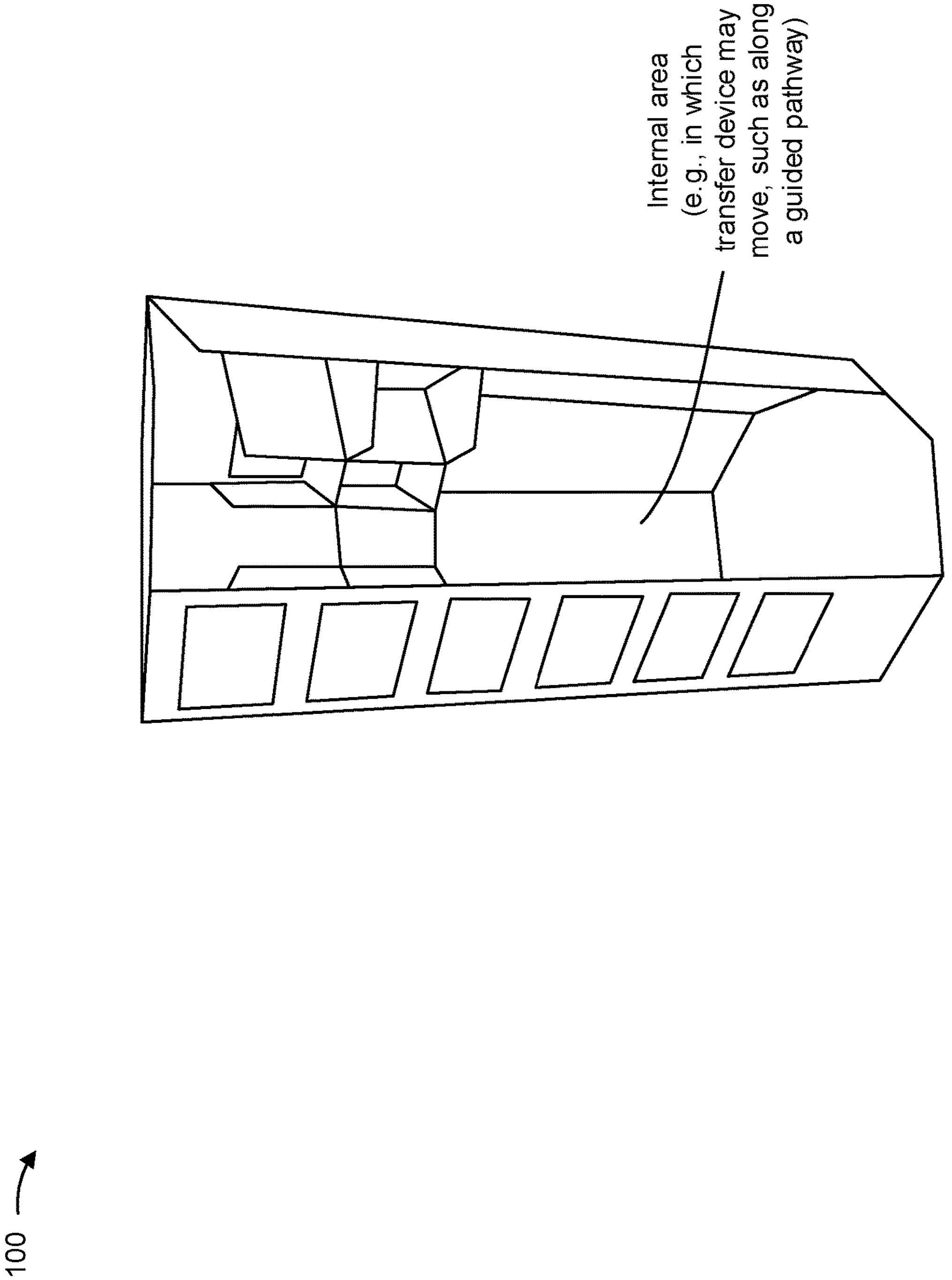

As one example, FIGS. 1B and 1C are perspective views of an example symmetrical ATM head unit configuration (e.g., an angular pattern, such as a circular pattern, a hexagonal pattern, and/or the like) in which ATM head units may be arranged. Although not shown, in some implementations, each face of one or more faces of the ATM head unit configuration may include an ATM head unit, such that users may generally position (e.g., stand) around the ATM head unit configuration to interact with individual ATM head units. In some implementations, an ATM head unit may be positioned at one of multiple locations on a face of the ATM head unit configuration. This permits, for example, different faces of the ATM head unit configuration to include ATM head units at different heights—e.g., a first face having an ATM head unit positioned at a first height relative to the floor or ground, a second face having an ATM head unit positioned at a second height relative to the floor or ground, and so on. Here, rear portions of all the ATM head units may generally be directed to an inner central portion of the ATM head unit configuration, and positioned to interface with a transfer device. Although not shown, in some implementations, the ATM system may include a guided pathway (e.g., similar to that described above in connection with example implementation 100 of FIG. 1A) that permits a transfer device to move vertically, move horizontally, and/or rotate about one or more axes so as to enable alignment of the transfer device with the rear portion of each of the ATM head units. In some implementations, the instrument storage and dispensing device may be located on a level that is below a level on which the ATM head unit configuration is located (e.g., underground if the ATM head unit configuration is located on the ground). In such cases, the transfer device may traverse between floor levels (e.g., along portion(s) of a guided pathway) to conduct instrument transfers between the instrument storage and dispensing device and the ATM head units.

Figure 1D:
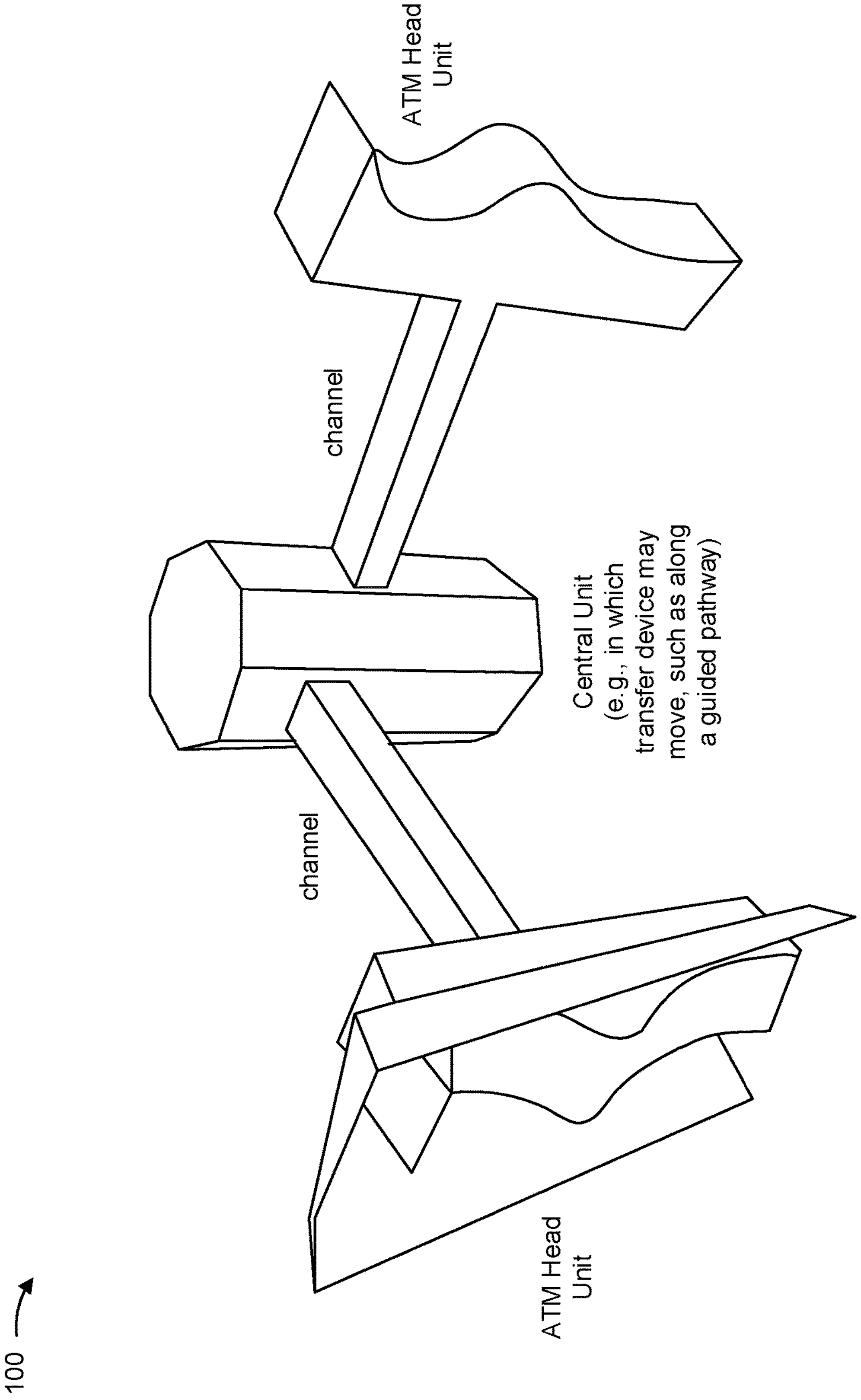
Figure 1E:
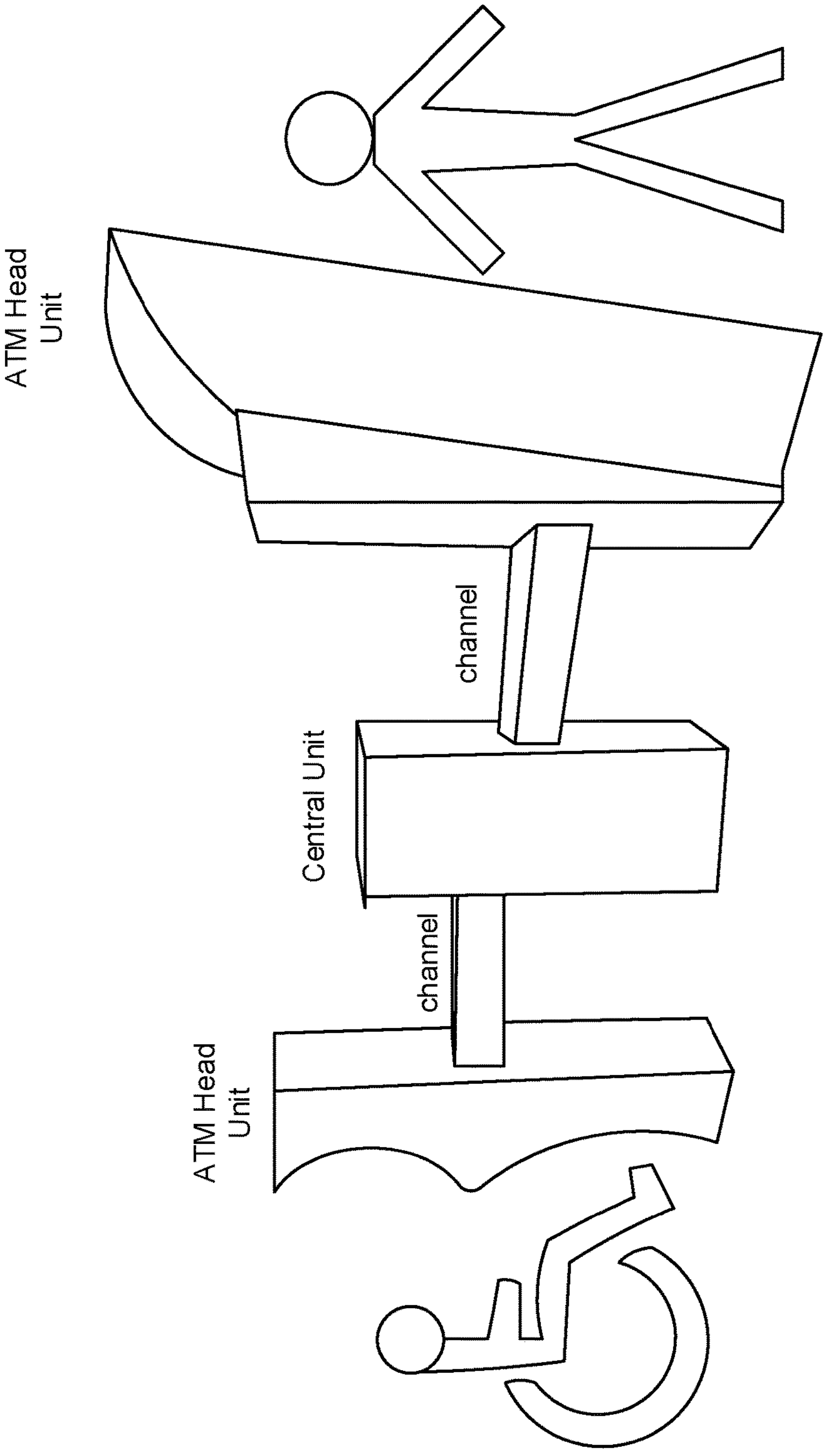

As another example, FIGS. 1D and 1E are perspective views of example ATM head unit configurations in which multiple ATM head units are coupled to a central unit. Although not shown, in some implementations, an instrument storage and dispensing device may be disposed within the central unit. In such cases, a transfer device may move along one or more guided pathways (e.g., by rotating, moving vertically, moving horizontally, and/or the like) within the central unit to interface the instrument storage and dispensing device with individual channels corresponding and/or leading to the ATM head units. Alternatively, in some implementations, the instrument storage and dispensing device may be disposed on a different level (e.g., a level below a level on which the ATM head unit configuration is located). In such cases, the transfer device may move along one or more guided pathways, that traverse the different levels, to interface the instrument storage and dispensing device with individual channels corresponding and/or leading to the ATM head units.

Figure 1F:
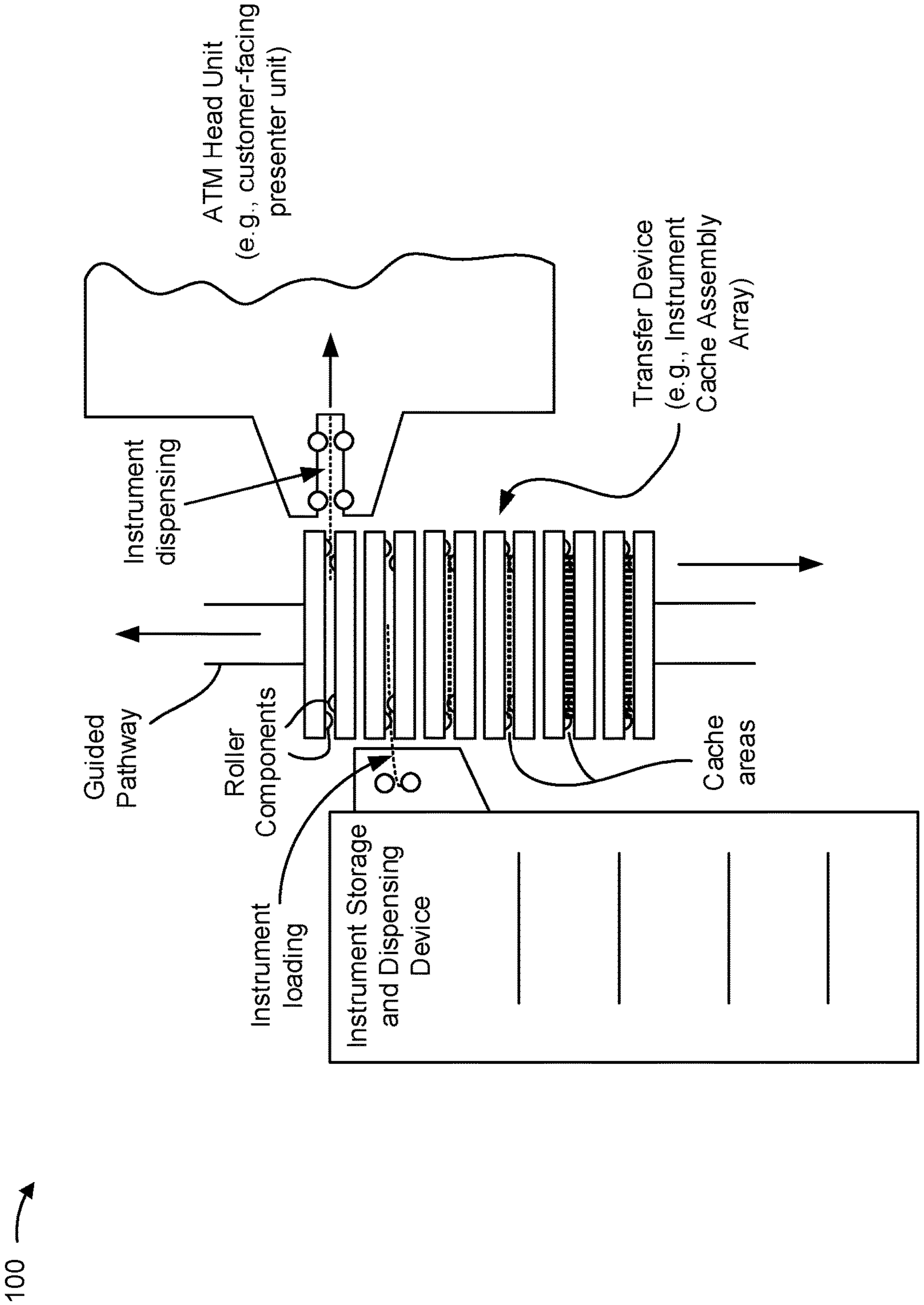

In some implementations, a transfer device may include multiple cache areas for storing preselected quantities of instruments (e.g., cash withdrawal pools or bundles) to enable faster dispensing of instruments at amounts that users typically need. FIG. 1F is a diagram of an example implementation of an ATM system that includes an instrument storage and dispensing device, and a transfer device having an instrument cache assembly array. The cache areas may be individually separated from one another, and configured to store instruments. In some implementations, each cache area may include one or more sets of roller components configured to transfer instruments through the cache area—e.g., to receive instruments from the instrument storage and dispensing device and/or to provide instruments to one or more ATM head units for dispensing, through a withdrawal slot, to a user.

As an example, in a case where it is determined that a threshold quantity of users (e.g., a majority of users) typically request $100 in twenty-dollar bills, the processor may cause the transfer device to preload each of one or more of the cache areas with $100 in twenty-dollar bills, so as to increase transaction processing speeds for the majority of users, which conserves power resources that would otherwise be expended to process user requests at slower speeds. Continuing with the example, the processor may cause the transfer device to preload each of one or more of the other cache areas with other quantities of instruments (e.g., of one or more denominations, of one or more total cash values, and/or the like) based on other amounts that users typically need, and so on.

In some implementations, the ATM system may use one or more machine learning algorithms configured to learn the quantities of instruments (e.g., of one or more denominations) to preload into each cache of the plurality of cache areas of a transfer device (e.g., similar to the machine learning algorithms described above—e.g., trained based on known inputs, known outputs, and/or feedback received from a user and/or a management device). For example, training data, for the machine learning algorithm(s), may include historical data on denominations requested/provided, historical data on cash values requested/provided, historical data based on geographic location, historical data based on time of day/day of week, historical data based on an ATM at a present bank branch, historical data based on denominations deposited (e.g., based on geographic location, time of day/day of week, present bank branch), and/or the like.

To facilitate preloading of instruments in the transfer device and/or providing instruments from the transfer device to the one or more ATM head units, a processor (e.g., similar to the processor described above in connection with example implementation 100 of FIG. 1A) may be configured to cause the transfer device to move along a guided pathway (e.g., as shown) such that individual cache areas may align with an output portion of the instrument storage and dispensing device and/or an input portion (e.g., that leads to a withdrawal slot) of an ATM head unit.

In some implementations, an ATM head unit may include multiple customer-facing withdrawal slots that are each configured to dispense instruments to a user. In some implementations, the customer-facing withdrawal slots may be aligned with individual cache areas of a transfer device (e.g., similar to that shown in FIG. 1F) so as to receive different preselected amounts (and/or denomination(s)) of instruments) from the transfer device for dispensing to a user. This enables, for example, rapid dispensing, of an amount of cash requested by a user, via a combination of the customer-facing withdrawal slots. As an example, a first cache area may store a single $20 bill, a second cache area may store two $20 bills, and so on, and depending on an amount of cash requested by a user, the processor may cause one or more cache areas (e.g., rolling components in the cache area(s)) to dispense the stored cash accordingly to, or through, the corresponding customer-facing withdrawal slots. In this way, users may quickly receive certain preselected amounts of cash, such as $20, $40, $60, $80, $100, etc., from one or more (e.g., a combination) of the customer-facing withdrawal slots, resulting in faster transaction times.

Although the array of cache areas is shown in FIG. 1F to be arranged in a vertical direction, the array of cache areas may be arranged in a different manner (e.g., along a horizontal direction, axially, and/or the like). Further, although the transfer device is shown to generally move in the vertical direction for preloading cash withdrawal pools from the instrument storage and dispensing device and/or providing cash withdrawal pools to the customer-facing withdrawal slot(s) of an ATM head unit, the transfer device may be configured to generally move in a different direction (e.g., a horizontal direction, axially, and/or the like).

In this way, multiple ATM head units may share a single instrument storage and dispensing device, which permits for flexible placement of the ATM head units in a given space, and conserves costs associated with having multiple instrument storage and dispensing devices (including repair costs and/or maintenance costs). In addition, employing a transfer device, that includes cache areas that pre-stage cash withdrawal pools or bundles, enables faster cash dispensing and, therefore, increased ATM transaction throughput. This shortens the time needed for a user to remain logged in at an ATM head unit, which improves user experience and overall user account security, and conserves power resources.

As indicated above, FIGS. 1A-1F are provided merely as examples. Other examples are possible and may differ from what was described with regard to FIGS. 1A-1F. For example, transfer device implementations described herein may apply equally to obtaining items (e.g., instruments, documents, and/or the like) from the ATM head unit(s) (e.g., input by user(s)), and delivering the items to one or more backend devices for depositing or collection. As another example, rather than including cache areas in a transfer device, each ATM head unit may include an instrument caching device that includes such cache areas. In these cases, for example, a transfer device, similar to that described above in connection with example implementation 100 of FIG. 1A, may be utilized to interface the instrument storage and dispensing device and each of the instrument caching devices to individually preload instruments for each ATM head unit. As a further example, implementations described herein may apply equally to other types of systems that dispense items, such as vending machines and/or the like.

Figure 2:
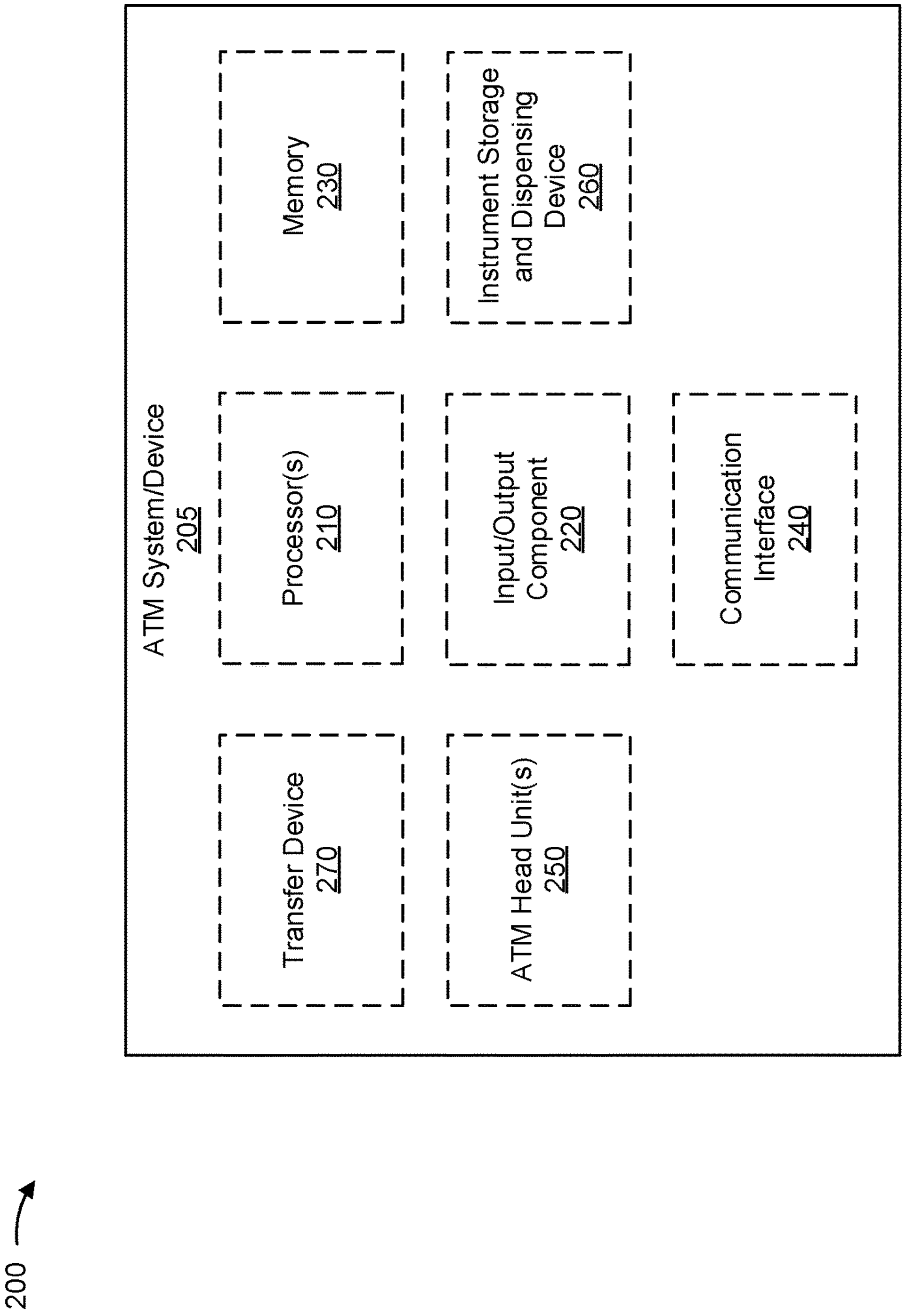
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ATM system/device 205 that includes various components and/or devices. Devices of environment 200 may interconnect via wired connections, wireless connections, or a combination of wired and wireless connections.

ATM system/device 205 includes one or more devices capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit card account, etc.), and/or the like. For example, ATM system/device 205 may include an ATM, an automated banking machine (ABM), a cash point, a Cashline®, a Minibank®, a cash machine, a Tyme® machine, a cash dispenser, a Bankomat®, a Bancomat®, and/or a similar type of device.

Processor 210 includes one or more types of processing components capable of being programmed to perform a function, such as one or more operations described elsewhere herein. For example, processor 210 may perform process 400 of FIG. 4, process 500 of FIG. 5, process 600 of FIG. 6, and/or the like. In some implementations, processor 210 may include a processor that controls movement of transfer device 270 (e.g., via motors coupled to transfer device 270), as described elsewhere herein. In some implementations, processor 210 may correspond to a processor, described in more detail below in connection with FIG. 3.

Input/output component 220 includes one or more components capable of being used to input information into, and/or output information from, ATM system/device 205. In some implementations, input/output component 220 may include one or more touch screen components, one or more keypads, and/or the like. In some implementations, input/output component 220 may be incorporated into one or more ATM head units 250. For example, input/output component 220 may be incorporated into an ATM head unit 250 to facilitate user interactions with ATM system/device 205. In some implementations, input/output component 220 may correspond to an input component and an output component, described in more detail below in connection with FIG. 3.

Memory 230 includes one or more types of memories capable of storing information. In some implementations, memory 230 may store information associated with performing one or more operations described elsewhere herein. For example, memory 230 may store information to be used (e.g., by processor 210) to perform process 400 of FIG. 4, process 500 of FIG. 5, process 600 of FIG. 6, and/or the like. In some implementations, memory 230 may correspond to a memory or storage component, described in more detail below in connection with FIG. 3.

Communication interface 240 includes one or more types of communication interfaces that allow ATM system/device 205 to communicate with other devices (e.g., server device(s) and/or the like—not shown), such as via a wired connection, a wireless connection, or a combination of wired and wireless connections. For example, communication interface 240 may be used to read information from a transaction card, to transmit information to, or receive information from a card validation device and/or a server device and/or the like. In some implementations, communication interface 240 may correspond to a communication interface, described in more detail below in connection with FIG. 3.

ATM head unit(s) 250 include one or more devices capable of interacting with a user to facilitate ATM transactions. For example, ATM head unit 250 may include a display (e.g., a capacitive touch screen), a keypad, and/or the like. In some implementations, ATM head unit 250 may receive instruments stored in and/or provided by instrument storage and dispensing device 260, and output the instruments to a user, as described elsewhere herein. In some implementations, ATM head unit 250 may correspond to an input component and/or an output component, described in more detail below in connection with FIG. 3.

Instrument storage and dispensing device 260 includes one or more devices capable of storing and providing instruments. For example, instrument storage and dispensing device 260 may include a safe or a vault configured to safeguard instruments, such as cash. In some implementations, instrument storage and dispensing device 260 may provide instruments to one or more ATM head units 250 based on ATM transactions initiated by one or more users, as described elsewhere herein.

Transfer device 270 includes one or more devices capable of physically transferring instruments between devices. In some implementations, transfer device 270 may be arranged to interface instrument storage and dispensing device 260 and ATM head unit(s) 250, as described elsewhere herein. In some implementations, transfer device 270 may be controlled by processor 210 to move along one or more guided pathways to facilitate instrument transfers, as described elsewhere herein. In some implementations, transfer device 270 may include multiple cache areas for storing preselected quantities of instruments, as described elsewhere herein.

The number and arrangement of devices and components shown in FIG. 2 are provided as an example. In practice, there may be additional devices and/or components, fewer devices and/or components, different devices and/or components, or differently arranged devices and/or components than those shown in FIG. 2. Furthermore, two or more devices or component shown in FIG. 2 may be implemented within a single device or component, or a single device or component shown in FIG. 2 may be implemented as multiple, distributed devices or components. Additionally, or alternatively, a set of devices or components of environment 200 may perform one or more functions described as being performed by another set of devices or components of environment 200.

Figure 3:
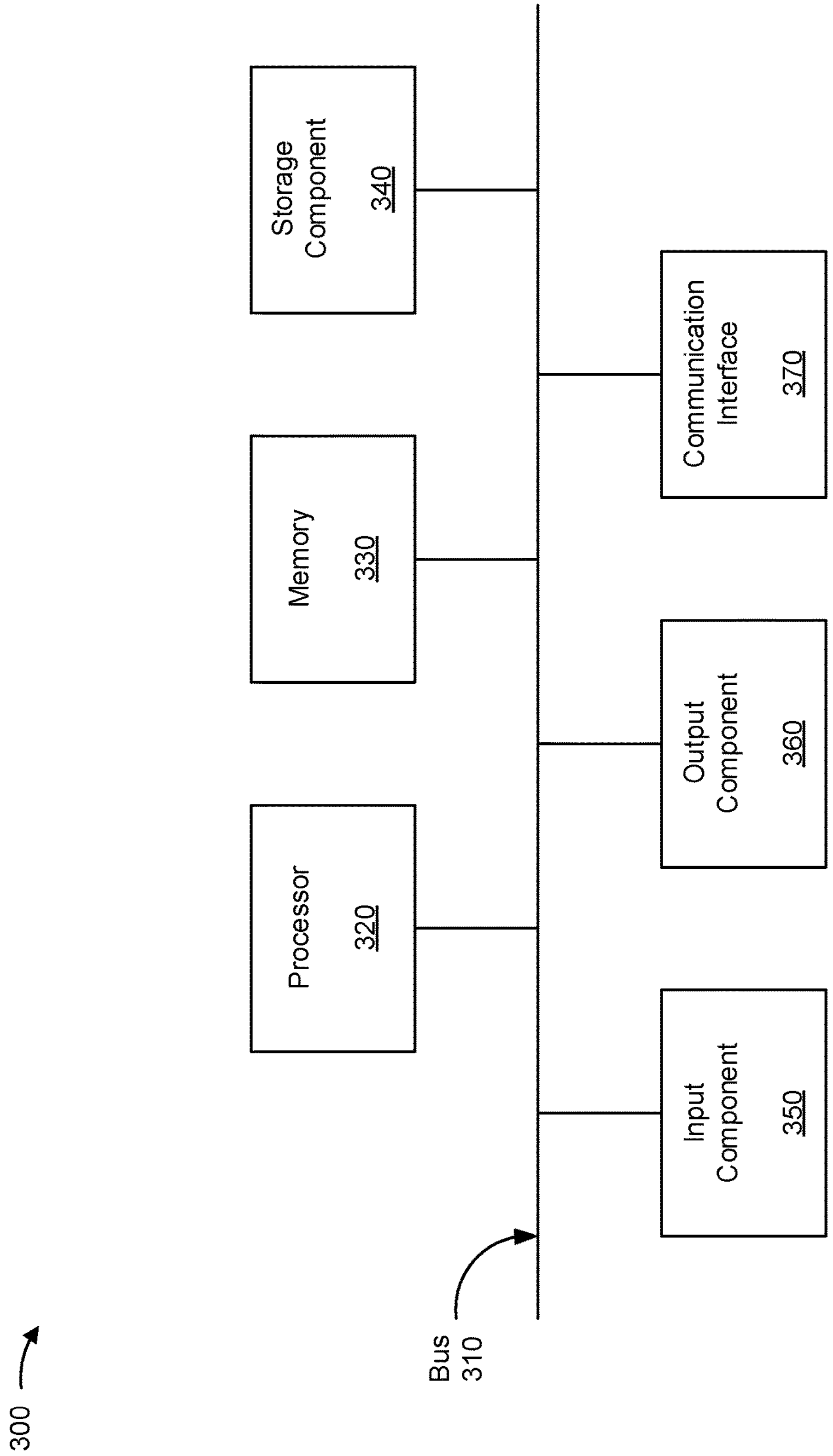
FIG. 3 is a diagram of example components of one or more devices of FIG. 2.

FIG. 3 is a diagram of example components of a device 300. Device 300 may correspond to ATM system/device 205. In some implementations, ATM system/device 205 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
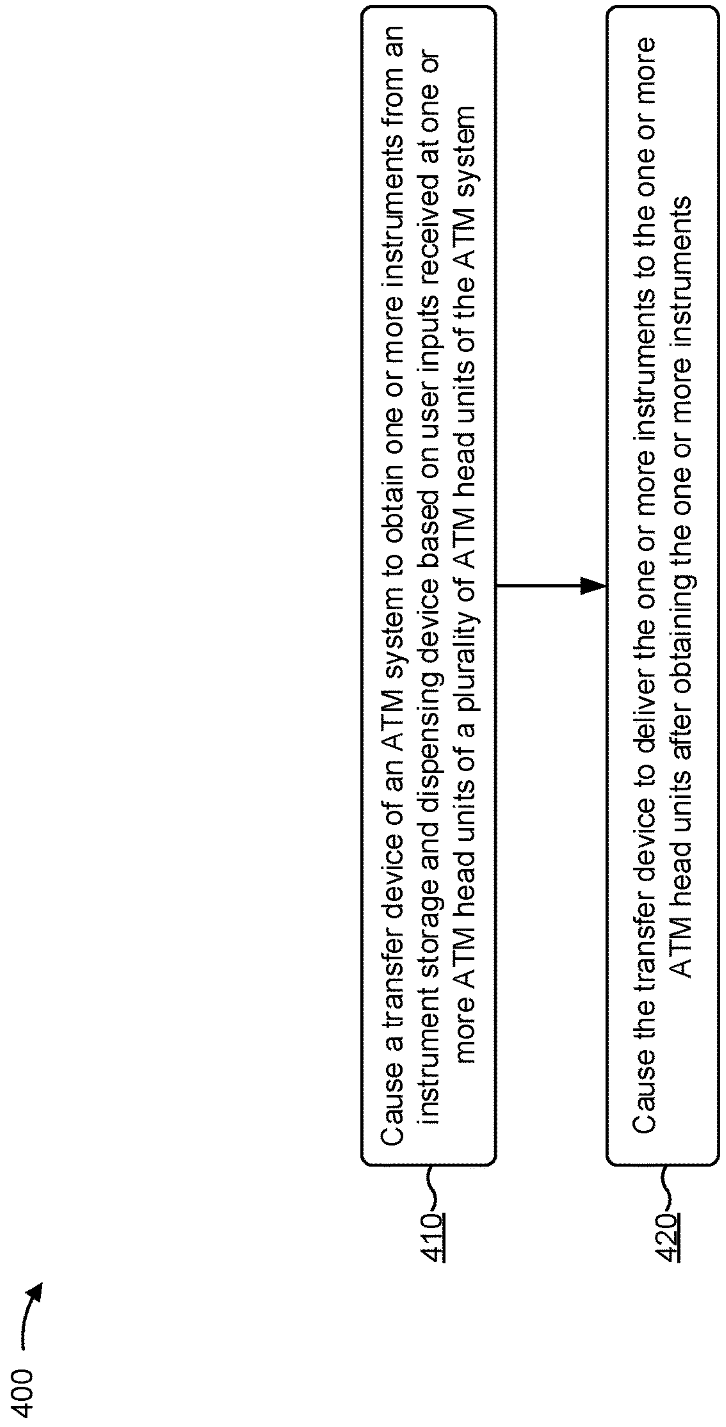
FIG. 4 is a flow chart of an example process for facilitating ATM transactions using a transfer device in an ATM system.

FIG. 4 is a flow chart of an example process 400 for facilitating ATM transactions using a transfer device in an ATM system. In some implementations, one or more process blocks of FIG. 4 may be performed by an ATM system (e.g., ATM system/device 205). In some implementations, one or more process blocks of FIG. 4 may be performed by another device or a group of devices separate from or including the ATM system. In some implementations, the ATM system may include an instrument storage and dispensing device (e.g., instrument storage and dispensing device 260) configured to store and provide instruments, a plurality of ATM head units (e.g., ATM head units 250). In some implementations, each ATM head unit, of the plurality of ATM head units, may be configured to interact with users to facilitate ATM-based transactions. In some implementations, the ATM system may include a transfer device (e.g., transfer device 270) configured to interface the instrument storage and dispensing device with each ATM head unit of the plurality of ATM head units. In some implementations, the ATM system may include one or more memories (e.g., memory 230), and one or more processors (e.g., processor 210), communicatively coupled to the one or more memories, configured to perform process 400.

As shown in FIG. 4, process 400 may include causing the transfer device to obtain one or more instruments from the instrument storage and dispensing device based on user inputs received at one or more ATM head units of the plurality of ATM head units (block 410). For example, the ATM system (e.g., using processor 320, memory 330, storage component 340, and/or the like) may cause the transfer device to obtain one or more instruments from the instrument storage and dispensing device based on user inputs received at one or more ATM head units of the plurality of ATM head units, as described above in connection with FIGS. 1A-1F.

As further shown in FIG. 4, process 400 may include causing the transfer device to deliver the one or more instruments to the one or more ATM head units after obtaining the one or more instruments (block 420). For example, the ATM system (e.g., using processor 320, memory 330, storage component 340, and/or the like) may cause the transfer device to deliver the one or more instruments to the one or more ATM head units after obtaining the one or more instruments, as described above in connection with FIGS. 1A-1F.

Process 400 may include additional implementations, such as any single implementation or any combination of implementations described below and/or in connection with one or more other processes described elsewhere herein.

In some implementations, the ATM system may include a guided pathway disposed between the instrument storage and dispensing device and the plurality of ATM head units. In some implementations, the ATM system may cause the transfer device to move along the guided pathway, to a position on the guided pathway that is proximate to the instrument storage and dispensing device, to obtain the one or more instruments. In some implementations, the ATM system may cause the transfer device to move along the guided pathway, to one or more positions on the guided pathway that are proximate to the one or more ATM head units, to deliver the one or more instruments. In some implementations, a portion of the guided pathway may be configured to guide the transfer device to move in a substantially vertical direction. In some implementations, a portion of the guided pathway may be configured to guide the transfer device to move in a substantially horizontal direction. In some implementations, a portion of the guided pathway may be configured to guide the transfer device to rotate about an axis of the transfer device.

In some implementations, the transfer device may include a plurality of cache areas for storing preselected quantities of instruments. In some implementations, the ATM system may cause the transfer device to deliver the one or more instruments from a cache area of the plurality of cache areas. In some implementations, at least one ATM head unit, of the plurality of ATM head units, may include a plurality of cache areas for storing preselected quantities of instruments.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
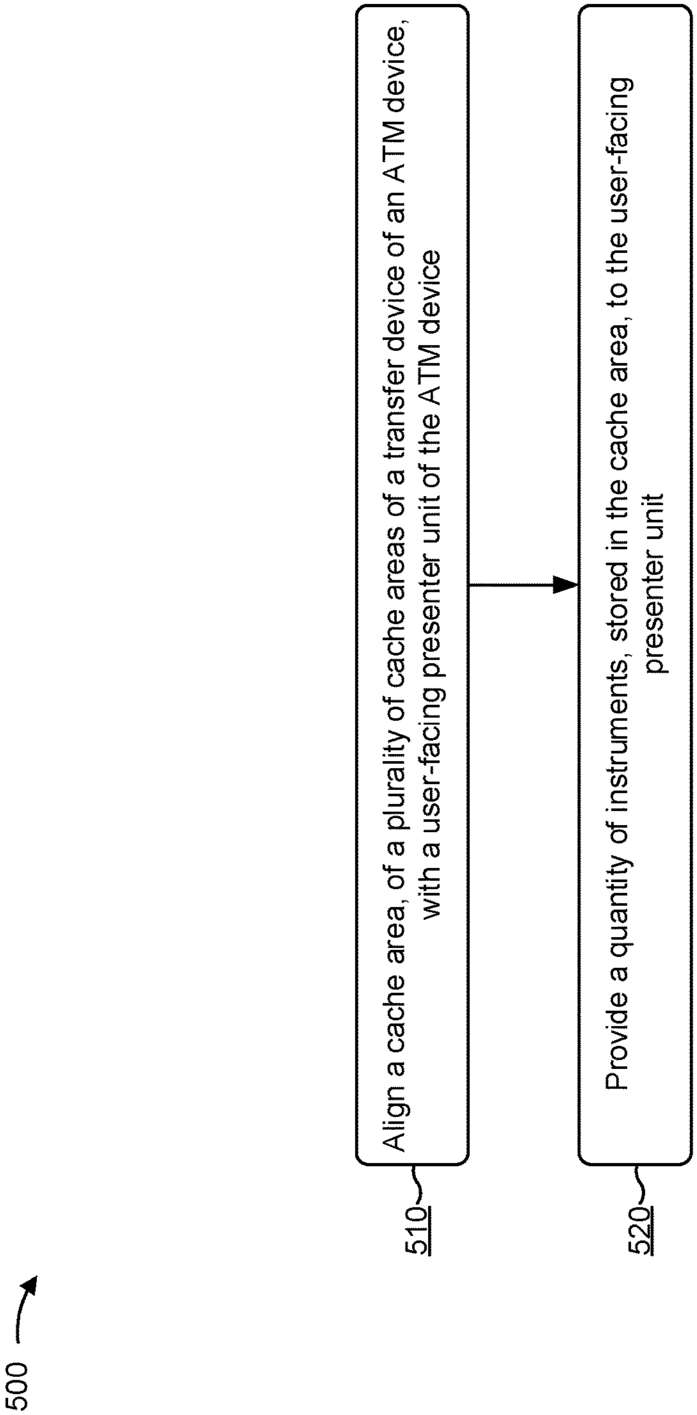
FIG. 5 is a flow chart of an example process for facilitating ATM transactions using a transfer device in an ATM system.

FIG. 5 is a flow chart of an example process 500 for facilitating ATM transactions using a transfer device in an ATM system. In some implementations, one or more process blocks of FIG. 5 may be performed by an ATM device (e.g., ATM system/device 205). In some implementations, one or more process blocks of FIG. 5 may be performed by another device or a group of devices separate from or including the ATM device. In some implementations, the ATM device may include an instrument storage and dispensing device (e.g., instrument storage and dispensing device 260) configured to store and provide instruments, a user-facing presenter unit (e.g., an ATM head unit 250) configured to interact with users to facilitate ATM-based transactions, and a transfer device (e.g., transfer device 270) configured to interface the instrument storage and dispensing device with the user-facing presenter unit. In some implementations, the transfer device may include a plurality of cache areas for storing preselected quantities of instruments. In some implementations, the ATM device may include one or more memories (e.g., memory 230), and one or more processors (e.g., processor 210), communicatively coupled to the one or more memories, configured to perform process 500. In some implementations, the ATM device may cause, based on a user input received at the user-facing presenter unit, the transfer device to perform process 500.

As shown in FIG. 5, process 500 may include aligning a cache area, of the plurality of cache areas, with the user-facing presenter unit (block 510). For example, the ATM device (e.g., using processor 320, memory 330, storage component 340, and/or the like) may align a cache area, of the plurality of cache areas, with the user-facing presenter unit, as described above in connection with FIGS. 1A-1F.

As further shown in FIG. 5, process 500 may include providing a quantity of instruments, stored in the cache area, to the user-facing presenter unit (block 520). For example, the ATM device (e.g., using processor 320, memory 330, storage component 340, and/or the like) may provide a quantity of instruments, stored in the cache area, to the user-facing presenter unit, as described above in connection with FIGS. 1A-1F.

Process 500 may include additional implementations, such as any single implementation or any combination of implementations described below and/or in connection with one or more other processes described elsewhere herein.

In some implementations, the ATM device may, prior to aligning the cache area with the user-facing presenter unit and prior to providing the quantity of instruments to the user-facing presenter unit, cause the transfer device to align the cache area with the instrument storage and dispensing device, and cause the instrument storage and dispensing device to preload the quantity of instruments into the cache area. In some implementations, the ATM device may, after providing the quantity of instruments to the user-facing presenter unit, cause the transfer device to align the cache area with the instrument storage and dispensing device, and cause the instrument storage and dispensing device to load an additional quantity of instruments into the cache area.

In some implementations, the ATM device may include a pathway configured to guide movement of the transfer device, and may cause the transfer device to move along the pathway to align the cache area with the user-facing presenter unit. In some implementations, each cache area, of the plurality of cache areas, may include one or more roller components. In some implementations, the ATM device may control the one or more roller components in the cache area to rotate such that the quantity of instruments is transferred to the user-facing presenter unit.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
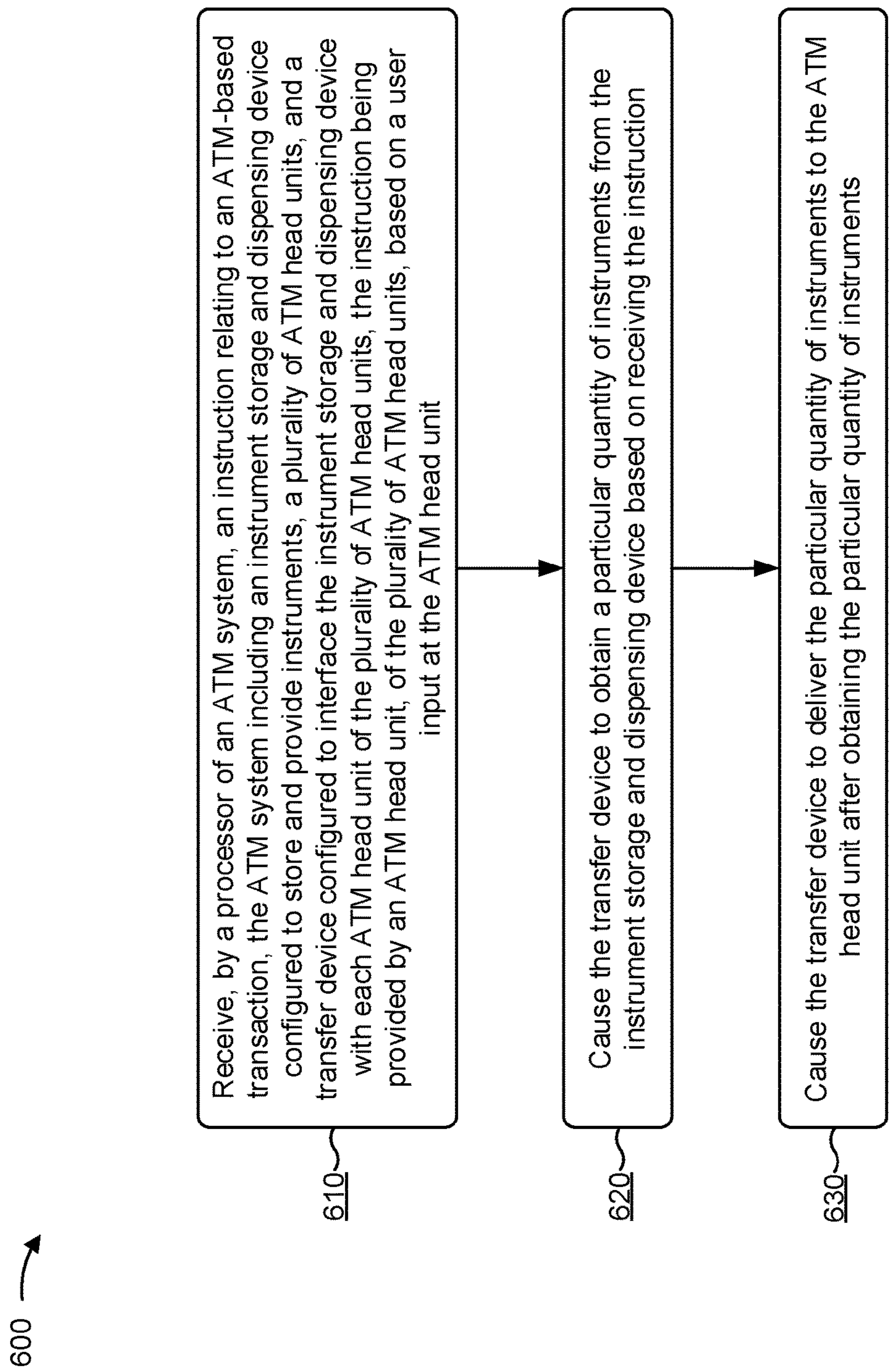
FIG. 6 is a flow chart of an example process for facilitating ATM transactions using a transfer device in an ATM system.

FIG. 6 is a flow chart of an example process 600 for facilitating ATM transactions using a transfer device in an ATM system. In some implementations, one or more process blocks of FIG. 6 may be performed by an ATM system (e.g., ATM system/device 205). In some implementations, one or more process blocks of FIG. 6 may be performed by another device or a group of devices separate from or including the ATM system.

As shown in FIG. 6, process 600 may include receiving, by a processor of an ATM system, an instruction relating to an ATM-based transaction, the ATM system including an instrument storage and dispensing device (e.g., instrument storage and dispensing device 260) configured to store and provide instruments, a plurality of ATM head units (e.g., ATM head units 250), and a transfer device (e.g., transfer device 270) configured to interface the instrument storage and dispensing device with each ATM head unit of the plurality of ATM head units, and the instruction being provided by an ATM head unit, of the plurality of ATM head units, based on a user input at the ATM head unit (block 610). For example, the ATM system (e.g., using processor 210, processor 320, memory 330, storage component 340, input component 350, communication interface 370, and/or the like) may receive an instruction relating to an ATM-based transaction, as described above in connection with FIGS. 1A-1F. In some implementations, the ATM system may include an instrument storage and dispensing device configured to store and provide instruments, a plurality of ATM head units, and a transfer device configured to interface the instrument storage and dispensing device with each ATM head unit of the plurality of ATM head units. In some implementations, the instruction may be provided by an ATM head unit, of the plurality of ATM head units, based on a user input at the ATM head unit.

As further shown in FIG. 6, process 600 may include causing the transfer device to obtain a particular quantity of instruments from the instrument storage and dispensing device based on receiving the instruction (block 620). For example, the ATM system (e.g., using processor 210, processor 320, memory 330, storage component 340, and/or the like) may cause the transfer device to obtain a particular quantity of instruments from the instrument storage and dispensing device based on receiving the instruction, as described above in connection with FIGS. 1A-1F.

As further shown in FIG. 6, process 600 may include causing the transfer device to deliver the particular quantity of instruments to the ATM head unit after obtaining the particular quantity of instruments (block 630). For example, the ATM system (e.g., using processor 210, processor 320, memory 330, storage component 340, and/or the like) may cause the transfer device to deliver the particular quantity of instruments to the ATM head unit after obtaining the particular quantity of instruments, as described above in connection with FIGS. 1A-1F.

Process 600 may include additional implementations, such as any single implementation or any combination of implementations described below and/or in connection with one or more other processes described elsewhere herein.

In some implementations, the plurality of ATM head units may be arranged in a substantially straight line. In some implementations, the plurality of ATM head units may be arranged in a circular pattern about an axis. In some implementations, the instrument storage and dispensing device may be disposed within a secured containing area that is separate, and external, from the plurality of ATM head units. In some implementations, the plurality of ATM head units may be disposed above a floor level, and the instrument storage and dispensing device may be disposed below the floor level.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, multiple ATM head units may share a single instrument storage and dispensing device, which permits for flexible placement of the ATM head units in a given space, and conserves costs associated with having multiple instrument storage and dispensing devices (including repair costs and/or maintenance costs). In addition, employing a transfer device, that includes cache areas, enables faster instrument dispensing and, therefore, increased ATM transaction throughput. This shortens the time needed for a user to remain logged in at an ATM head unit, which improves user experience and overall user account security, and conserves power resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An automated teller machine (ATM) system, comprising:
- an instrument storage and dispensing device configured to store and provide instruments;
- a plurality of ATM head units,
  - each ATM head unit, of the plurality of ATM head units, being configured to interact with users to facilitate ATM-based transactions;
- a transfer device configured to interface the instrument storage and dispensing device with each ATM head unit of the plurality of ATM head units,
  - the transfer device including a plurality of cache areas,
    - the plurality of cache areas being aligned with an output portion of the instrument storage and dispensing device and an input portion of a respective ATM head unit of the plurality of ATM head units, and
    - the plurality of cache areas each including a document handling component configured to receive the instruments through the document handling component in a respective cache area and to transfer the instruments through the respective cache area,
      - the document handling component including one or more roller components;
- one or more memories; and
- one or more processors, communicatively coupled to the one or more memories, configured to:
  - cause the transfer device to obtain one or more instruments, of the instruments, from the instrument storage and dispensing device based on user inputs received at one or more ATM head units of the plurality of ATM head units; and
  - cause the transfer device to deliver the one or more instruments to the one or more ATM head units after obtaining the one or more instruments,
    - wherein the one or more processors, when causing the transfer device to deliver the one or more instruments, are further configured to:
      - control the one or more roller components in the respective cache area to rotate such that the one or more the instruments are transferred to the one or more respective ATM head units.

2. The ATM system of claim 1, further comprising:
- a guided pathway disposed between the instrument storage and dispensing device and the plurality of ATM head units.

3. The ATM system of claim 2, wherein the one or more processors, when causing the transfer device to obtain the one or more instruments, are configured to:
- cause the transfer device to move along the guided pathway, to a position on the guided pathway that is proximate to the instrument storage and dispensing device, to obtain the one or more instruments.

4. The ATM system of claim 2, wherein the one or more processors, when causing the transfer device to deliver the one or more instruments, are configured to:
- cause the transfer device to move along the guided pathway, to one or more positions on the guided pathway that are proximate to the plurality of ATM head units, to deliver the one or more instruments.

5. The ATM system of claim 2, wherein a portion of the guided pathway is configured to guide the transfer device to move in a substantially vertical direction.

6. The ATM system of claim 2, wherein a portion of the guided pathway is configured to guide the transfer device to move in a substantially horizontal direction.

7. The ATM system of claim 2, wherein a portion of the guided pathway is configured to guide the transfer device to rotate about an axis of the transfer device.

8. The ATM system of claim 1, wherein the plurality of cache areas are configured to store preselected quantities of the instruments.

9. The ATM system of claim 8, wherein the one or more processors, when causing the transfer device to deliver the one or more instruments, are configured to:
- cause the transfer device to deliver the one or more instruments from a particular cache area of the plurality of cache areas.

10. An automated teller machine (ATM) device, comprising:

an instrument storage and dispensing device configured to store and provide instruments;

a user-facing presenter unit configured to interact with users to facilitate ATM-based transactions;

a transfer device configured to interface the instrument storage and dispensing device with the user-facing presenter unit, the transfer device including a plurality of cache areas for storing preselected quantities of the instruments, the plurality of cache areas being aligned with an output portion of the instrument storage and dispensing device and an input portion of the user-facing presenter unit, and the plurality of cache areas each including a document handling component configured to receive the instruments through the document handling component in a respective cache area and to transfer the instruments through the respective cache area, wherein the document handling component includes one or more roller components;

one or more memories; and one or more processors, communicatively coupled to the one or more memories, configured to cause, based on a user input received at the user-facing presenter unit, the transfer device to:

align a particular cache area, of the plurality of cache areas, with the user-facing presenter unit, provide a quantity of the instruments, stored in the particular cache area, to the user-facing presenter unit, and wherein the one or more processors, when causing the transfer device to provide the quantity of the instruments to the user-facing presenter unit, are configured to:

control the one or more roller components in the particular cache area to rotate such that the quantity of the instruments is transferred to the user-facing presenter unit.

11. The ATM device of claim 10, wherein the one or more processors are further configured to:

prior to aligning the particular cache area with the user-facing presenter unit and prior to providing the quantity of the instruments to the user-facing presenter unit, cause the transfer device to:

align the particular cache area with the instrument storage and dispensing device; and cause the instrument storage and dispensing device to preload the quantity of the instruments into the particular cache area.

12. The ATM device of claim 10, wherein the one or more processors are further configured to:

after providing the quantity of the instruments to the user-facing presenter unit, cause the transfer device to:

align the particular cache area with the instrument storage and dispensing device; and cause the instrument storage and dispensing device to load an additional quantity of the instruments into the particular cache area.

13. The ATM device of claim 10, further comprising a pathway configured to guide movement of the transfer device; and wherein the one or more processors, when causing the transfer device to align the particular cache area with the user-facing presenter unit, are configured to:

cause the transfer device to move along the pathway to align the particular cache area with the user-facing presenter unit.

14. A method, comprising:

receiving, by a processor of an automated teller machine (ATM) system, an instruction relating to an ATM-based transaction, the ATM system including:

an instrument storage and dispensing device configured to store and provide instruments, a plurality of ATM head units, and a transfer device configured to interface the instrument storage and dispensing device with each ATM head unit of the plurality of ATM head units, the instruction being provided by an ATM head unit, of the plurality of ATM head units, based on a user input at the ATM head unit, the transfer device including a plurality of cache areas for storing preselected quantities of the instruments, the plurality of cache areas being aligned with an output portion of the instrument storage and dispensing device and an input portion of a respective ATM head unit of the plurality of ATM head units, and the plurality of cache areas each including a document handling component configured to receive the instruments through the document handling component in a respective cache area and to transfer the instruments through the respective cache area, the document handling component including one or more roller components;

causing, by the processor, the transfer device to obtain a particular quantity of the instruments from the instrument storage and dispensing device based on receiving the instruction; and causing, by the processor, the transfer device to deliver the particular quantity of the instruments to the ATM head unit after obtaining the particular quantity of the instruments, wherein causing the transfer device to deliver the particular quantity of the instruments comprises:

controlling the one or more roller components in the respective cache area to rotate such that one or more instruments, of the instruments, is transferred to the respective ATM head unit.

15. The method of claim 14, wherein the plurality of ATM head units is arranged in a substantially straight line.

16. The method of claim 14, wherein the plurality of ATM head units is arranged in a circular pattern about an axis.

17. The method of claim 14, wherein the instrument storage and dispensing device is disposed within a secured containing area that is separate, and external, from the plurality of ATM head units.

18. The method of claim 14, wherein the plurality of ATM head units is disposed above a floor level; and wherein the instrument storage and dispensing device is disposed below the floor level.

19. The ATM system of claim 1, wherein at least one ATM head unit, of the plurality of ATM head units, includes another plurality of cache areas for storing preselected quantities of the instruments.

20. The ATM device of claim 10, wherein the transfer device is configured as a floating transfer head.

* * * * *